No. 891,163. PATENTED JUNE 16, 1908.
H. L. GUENTHER.
CAN CAPPING AND COMPRESSING MACHINE.
APPLICATION FILED JAN. 18, 1907.

12 SHEETS—SHEET 4.

WITNESSES:

INVENTOR
Henry L. Guenther
BY
ATTORNEYS

No. 891,163.

PATENTED JUNE 16, 1908.

H. L. GUENTHER.
CAN CAPPING AND COMPRESSING MACHINE.
APPLICATION FILED JAN. 18, 1907.

12 SHEETS—SHEET 5.

WITNESSES:

INVENTOR
Henry L. Guenther
BY
ATTORNEYS

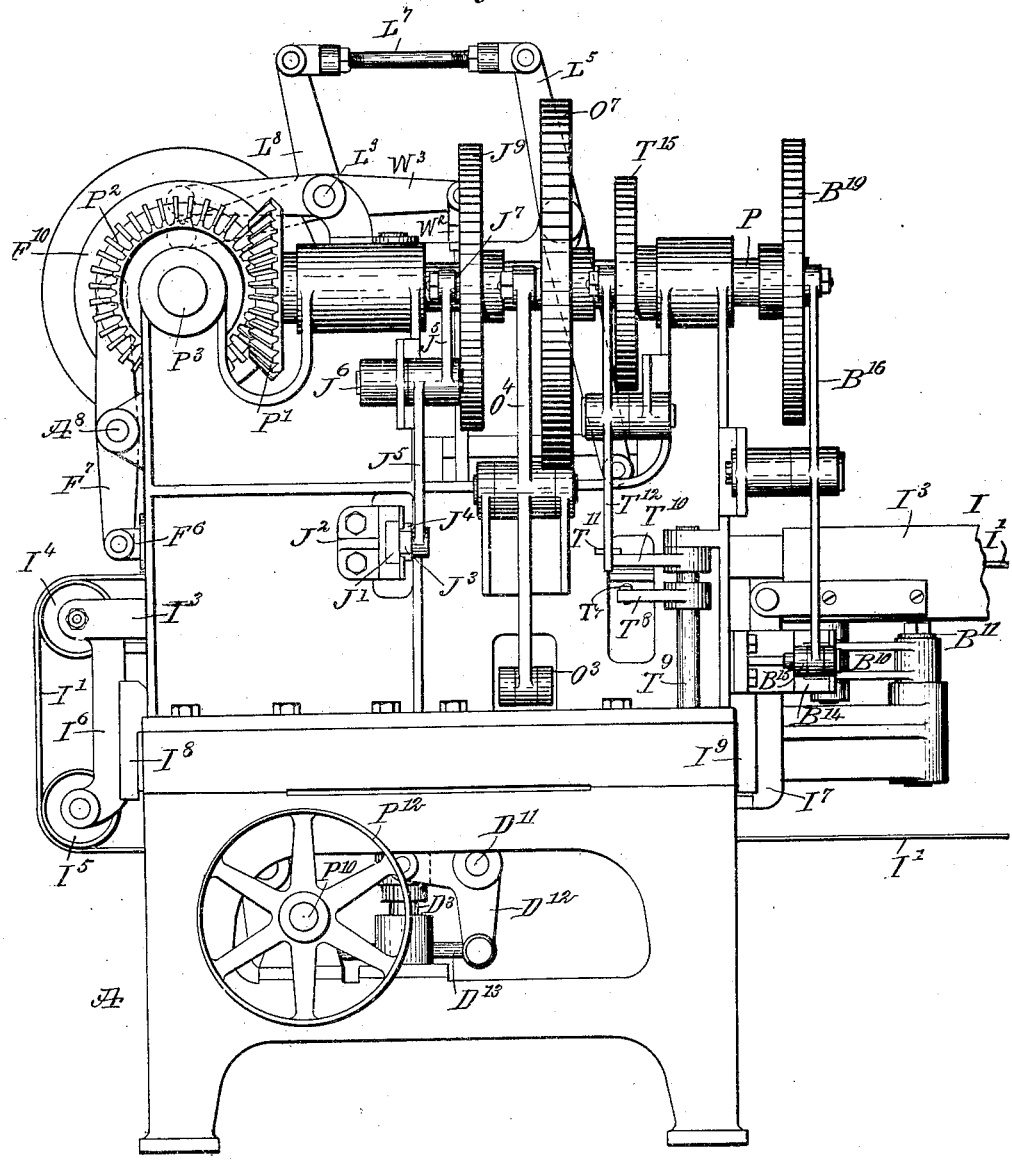

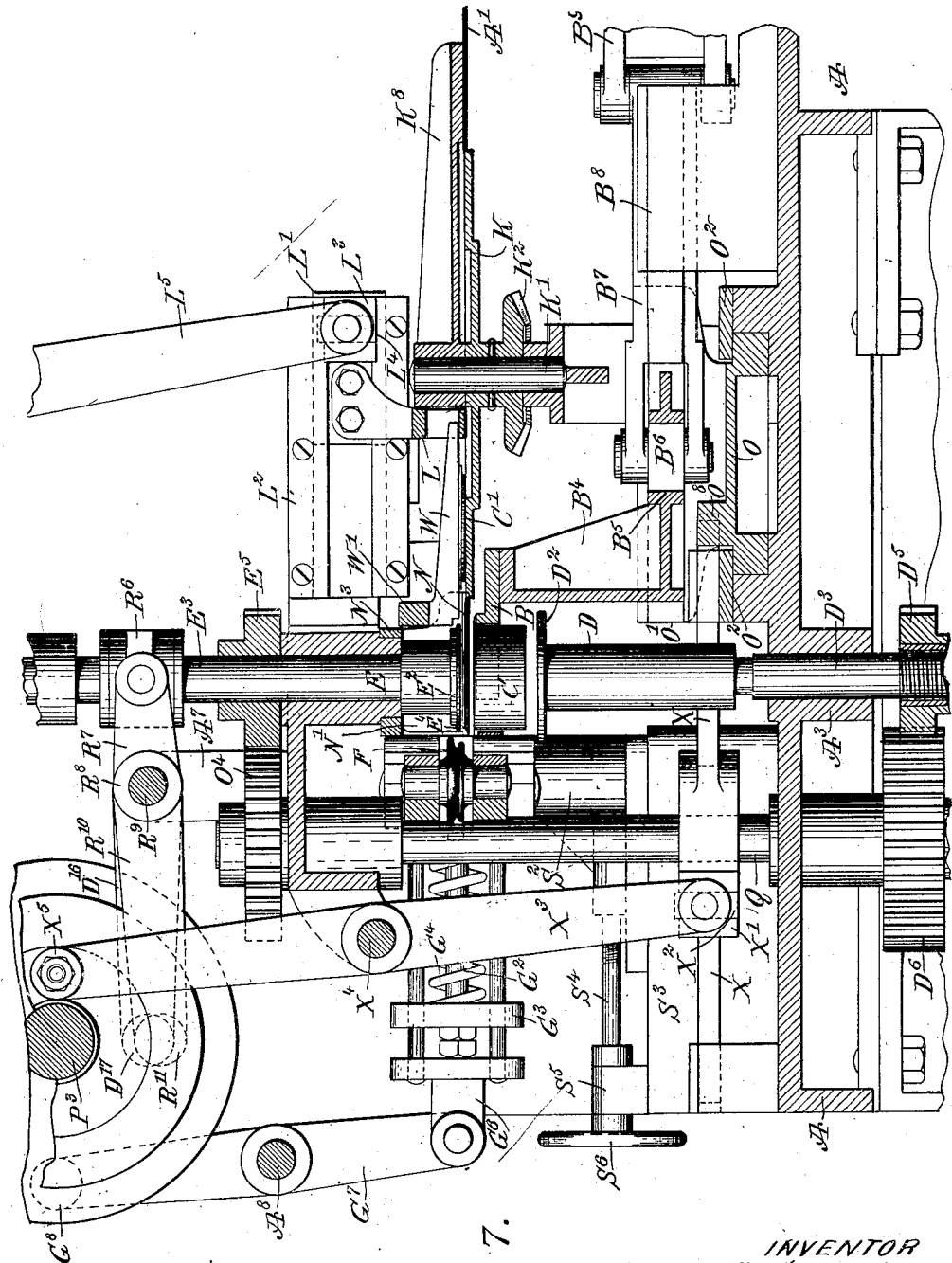

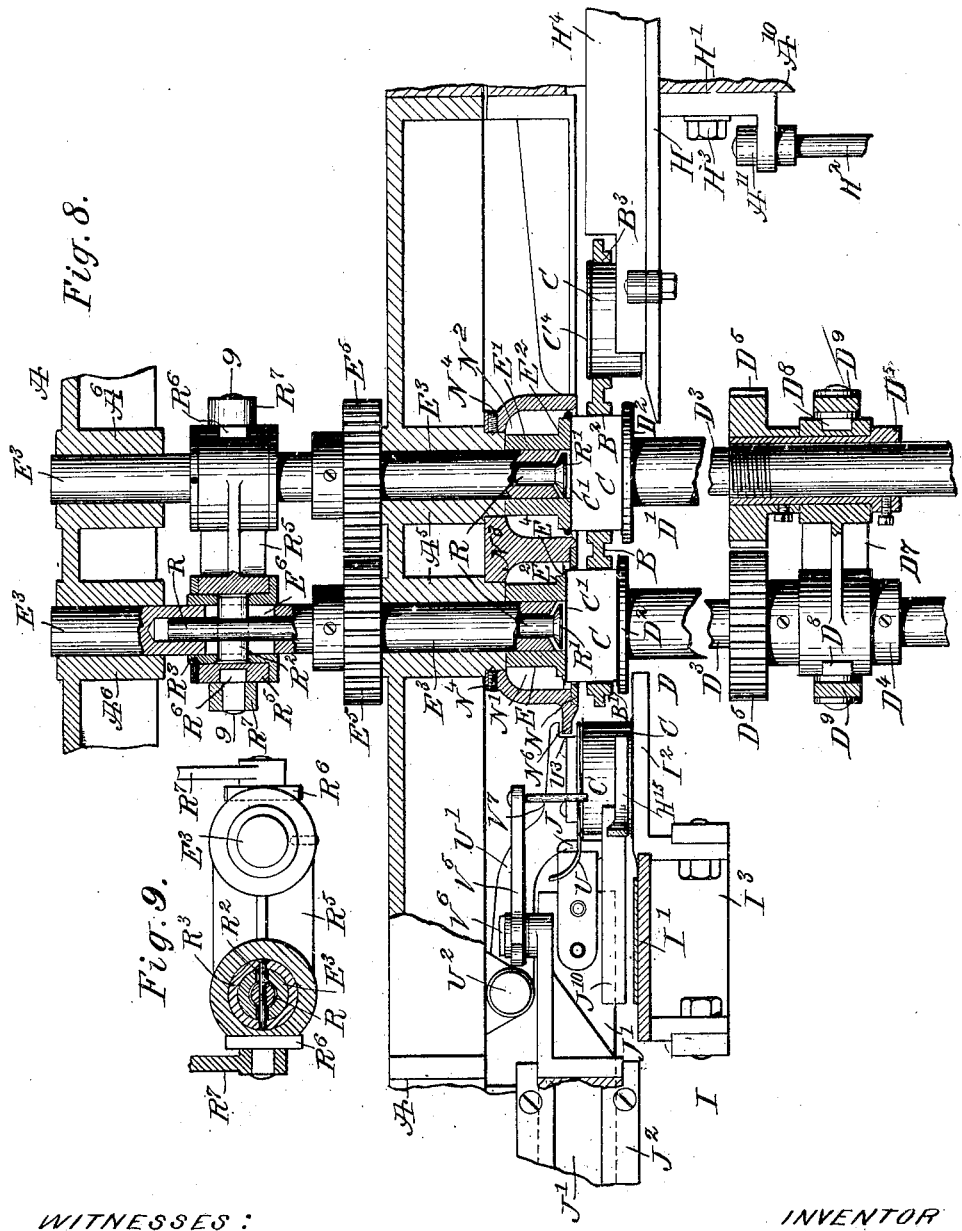

No. 891,163. PATENTED JUNE 16, 1908.
H. L. GUENTHER.
CAN CAPPING AND COMPRESSING MACHINE.
APPLICATION FILED JAN. 18, 1907.

12 SHEETS—SHEET 10.

WITNESSES
W. M. Avery
Geo. J. Hosted

INVENTOR
Henry L. Guenther
BY Munn & Co.
ATTORNEYS

No. 891,163. PATENTED JUNE 16, 1908.
H. L. GUENTHER.
CAN CAPPING AND COMPRESSING MACHINE.
APPLICATION FILED JAN. 18, 1907.

12 SHEETS—SHEET 11.

WITNESSES:

INVENTOR
Henry L. Guenther
BY
ATTORNEYS

No. 891,163. PATENTED JUNE 16, 1908.
H. L. GUENTHER.
CAN CAPPING AND COMPRESSING MACHINE.
APPLICATION FILED JAN. 18, 1907.
12 SHEETS—SHEET 12.
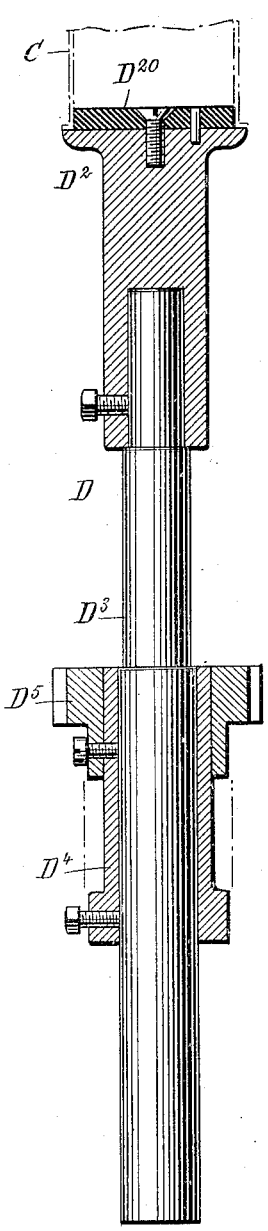
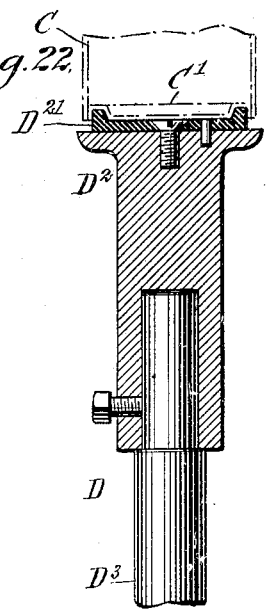
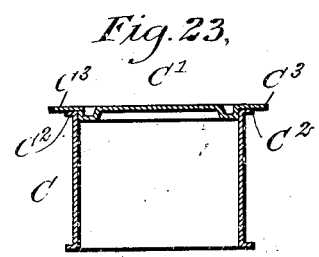
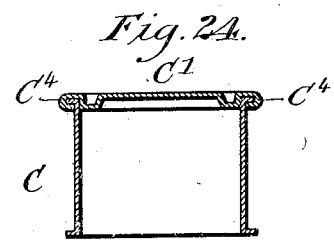
WITNESSES
Edward Thorpe
INVENTOR
Henry L. Guenther
BY Munn & Co
ATTORNEYS

UNITED STATES PATENT OFFICE.

HENRY LOUIS GUENTHER, OF ILWACO, WASHINGTON.

CAN CAPPING AND COMPRESSING MACHINE.

No. 891,163.  Specification of Letters Patent.  Patented June 16, 1908.

Application filed January 18, 1907. Serial No. 352,883.

*To all whom it may concern:*

Be it known that I, HENRY LOUIS GUENTHER, a citizen of the United States, and a resident of Ilwaco, in the county of Pacific and State of Washington, have invented a new and Improved Can Capping and Compressing Machine, of which the following is a full, clear and exact description.

The invention relates to machines for capping and compressing cans, such as shown and described in the Letters Patent of the United States, No. 698,701, granted to me on April 29, 1902.

The object of the present invention is to provide a new and improved can capping and compressing machine, arranged to automatically place a can head in position on the can body, to crimp and compress the flanges of the can body and head, with a view to form an air-tight double seam without the use of solder, packings or the like, thus rendering the can exceedingly serviceable for packing various food products therein.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
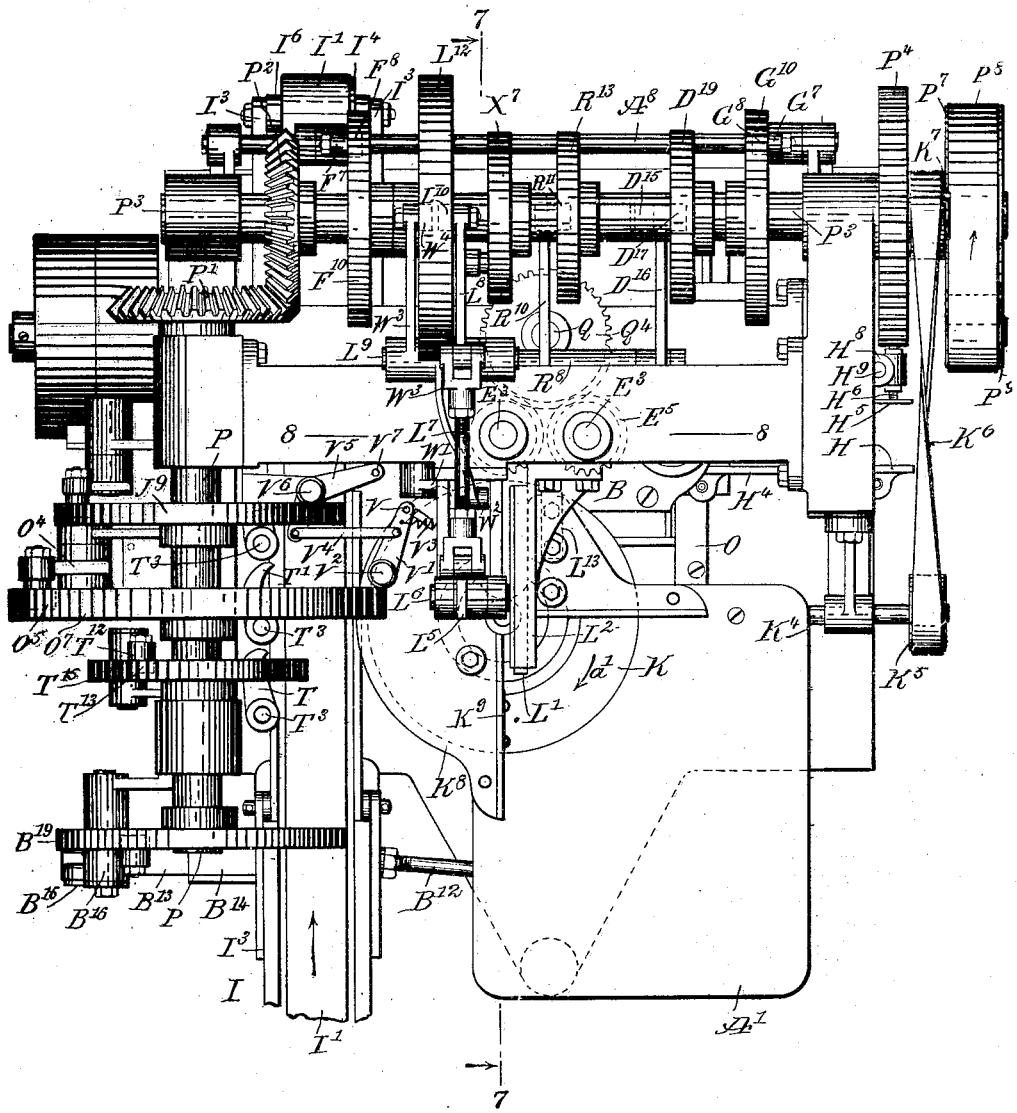
Figure 2:
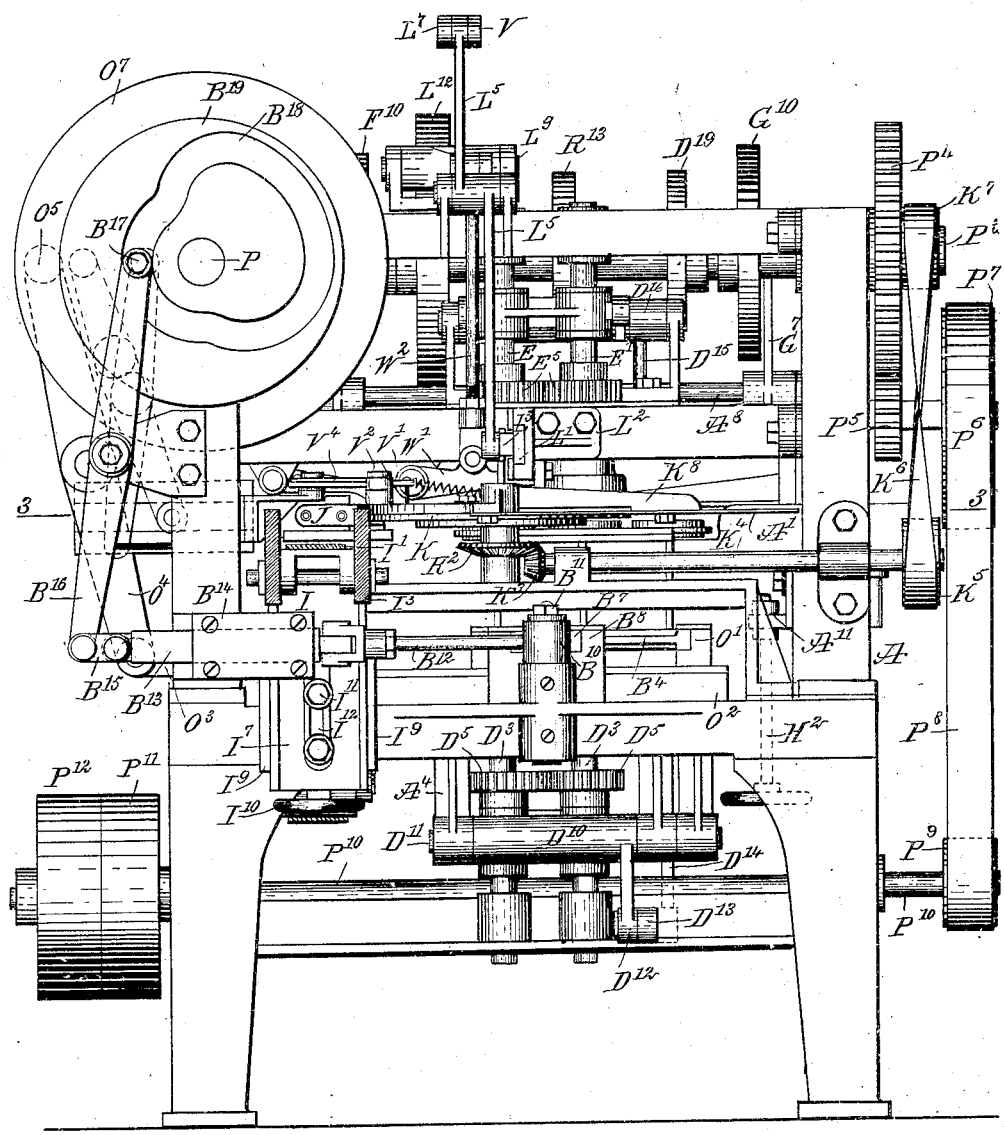
Figure 3:
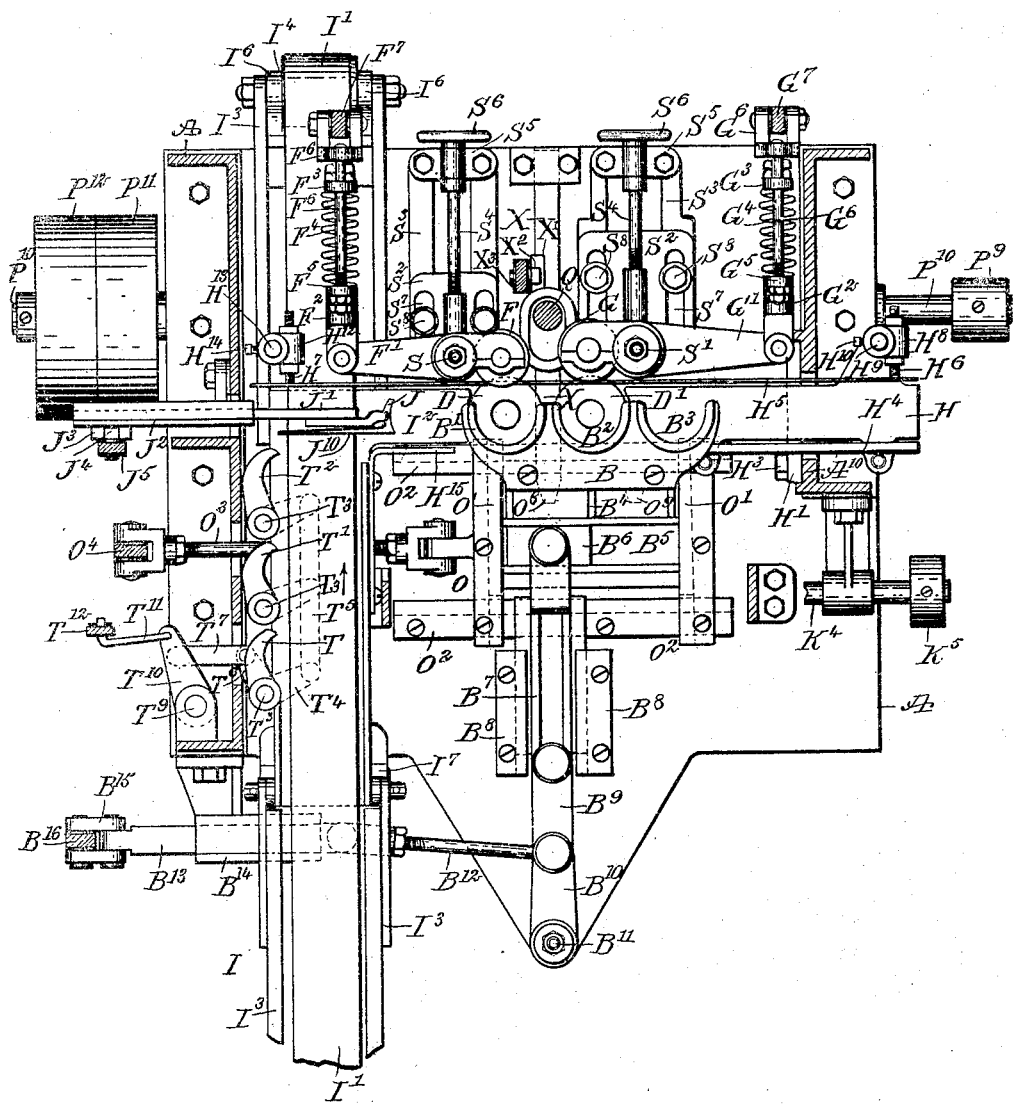
Figure 4:
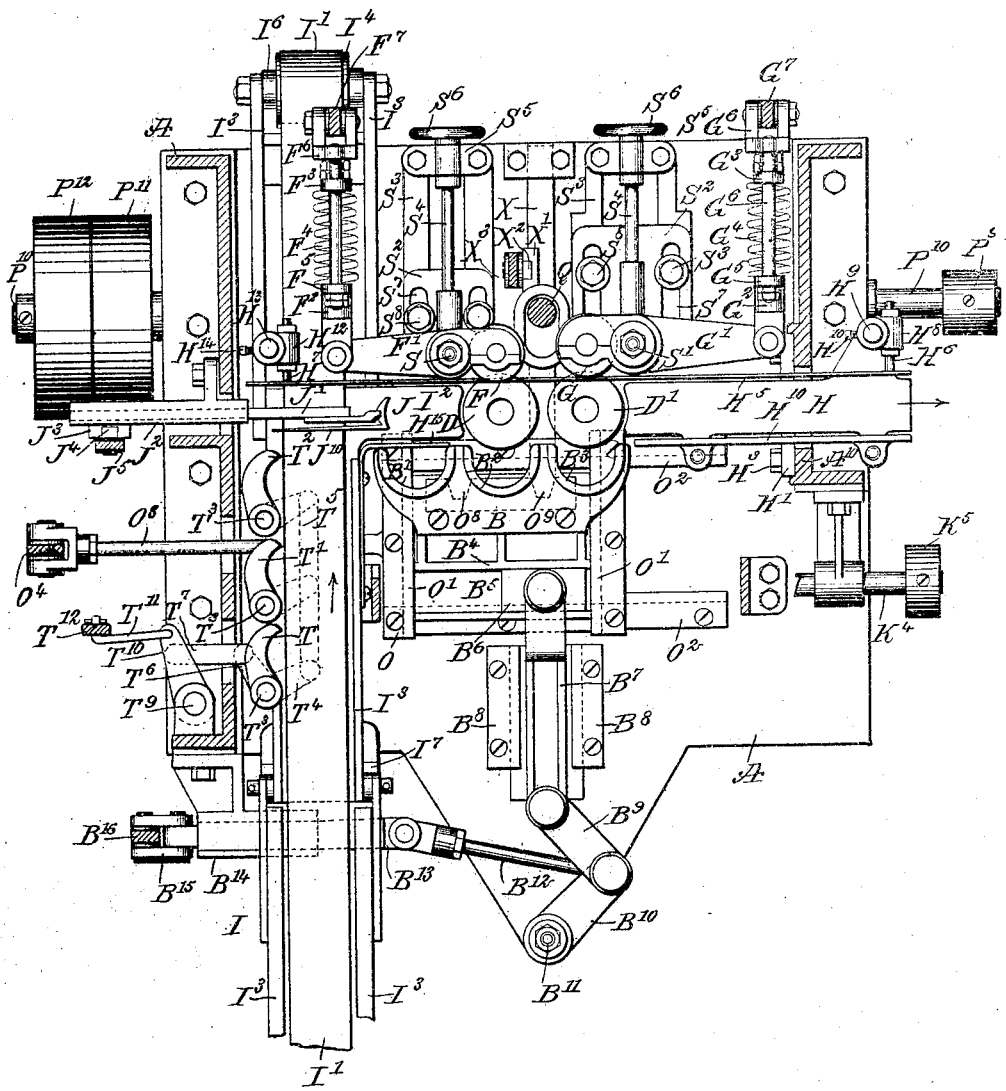
Figure 5:
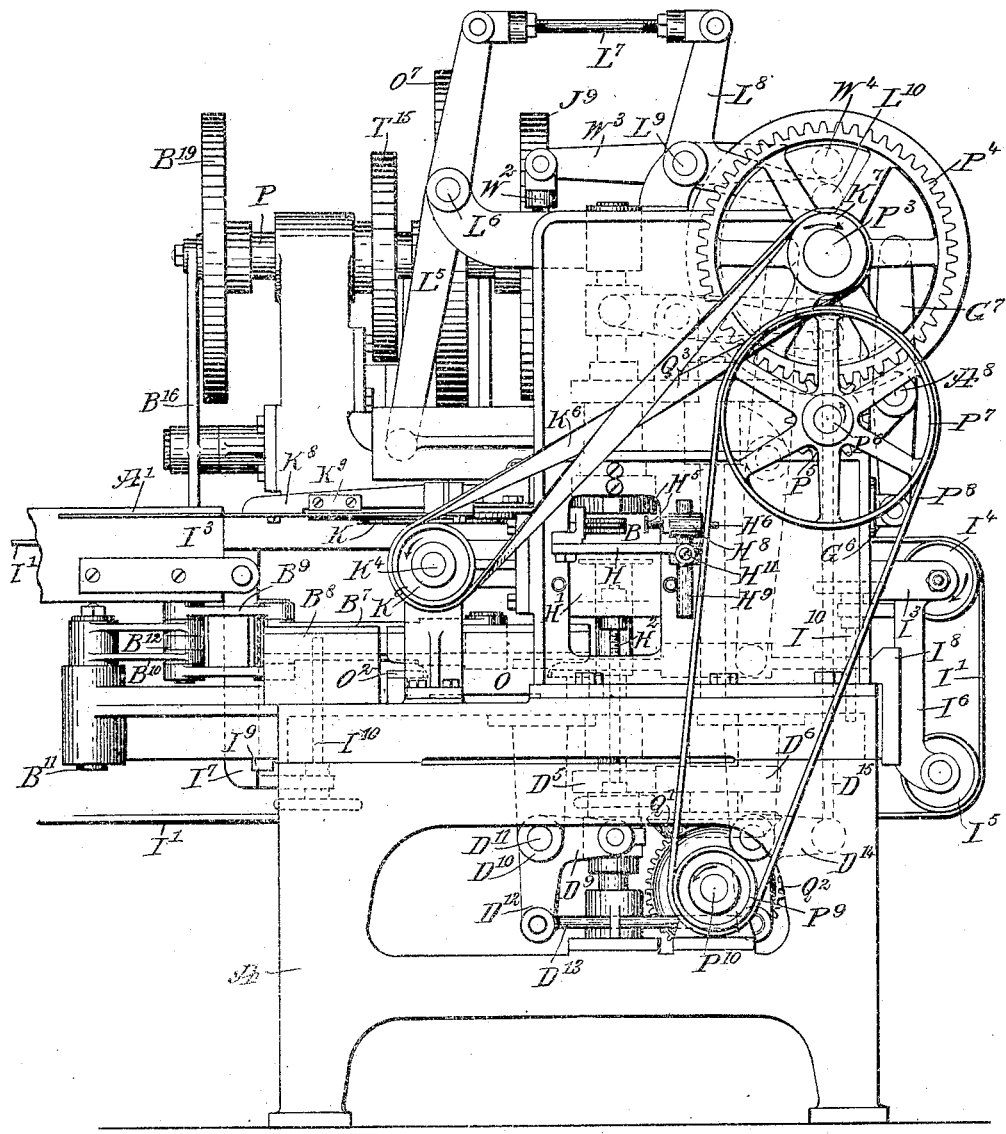
Figure 10:
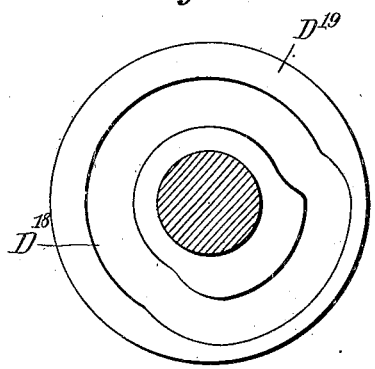
Figure 11:
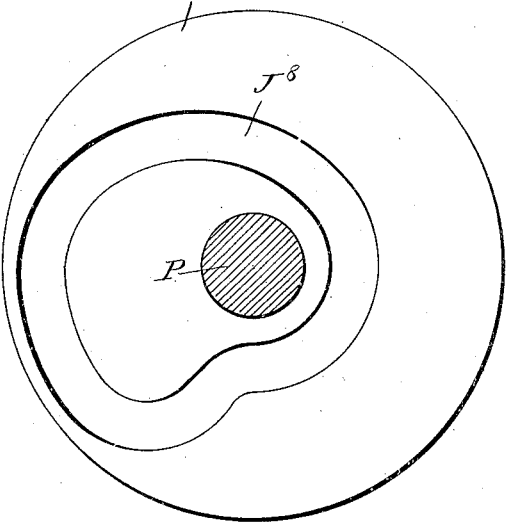
Figure 12:
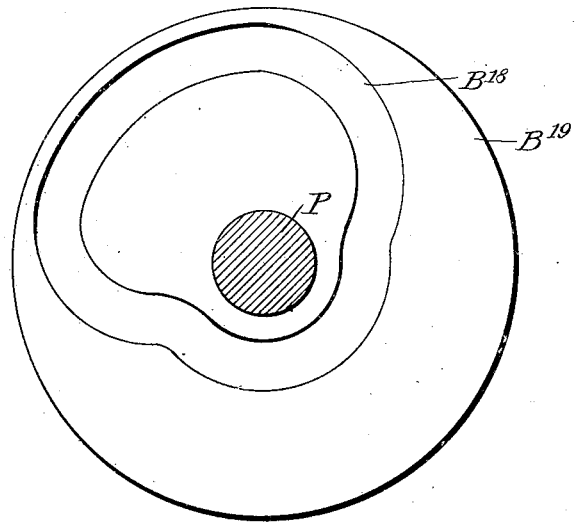
Figure 13:
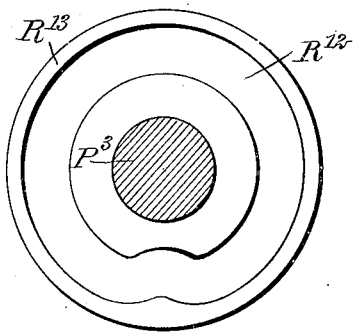
Figure 14:
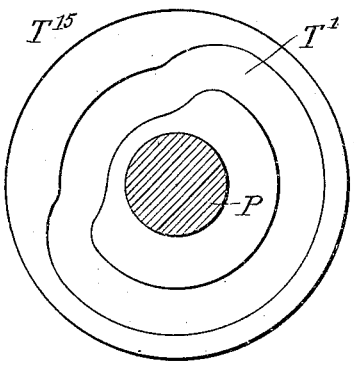
Figure 15:
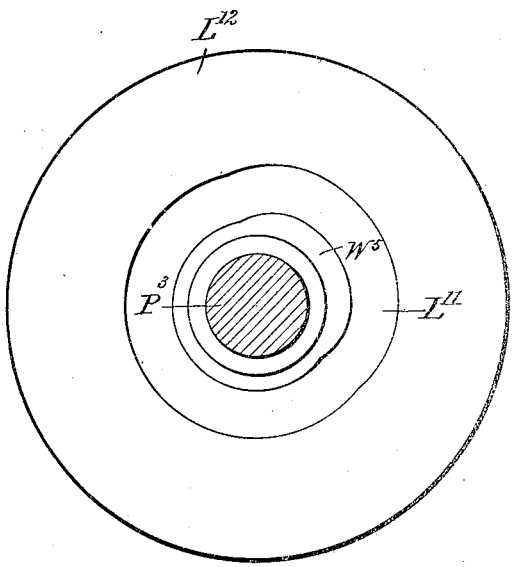
Figure 16:
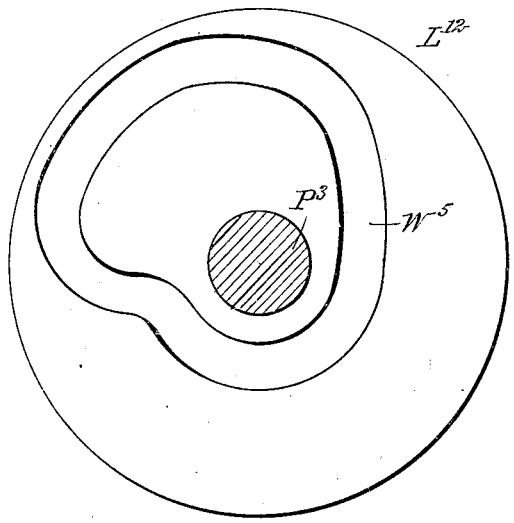
Figure 17:
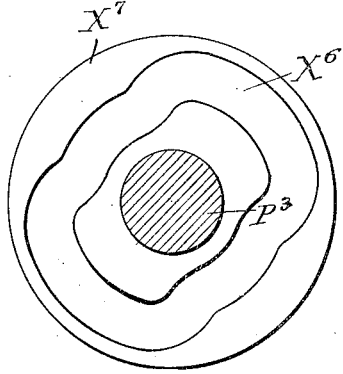
Figure 18:
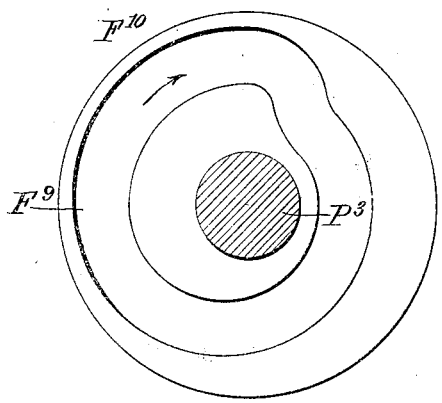
Figure 19:
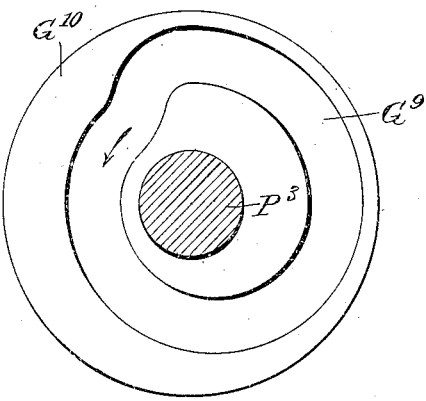
Figure 20:
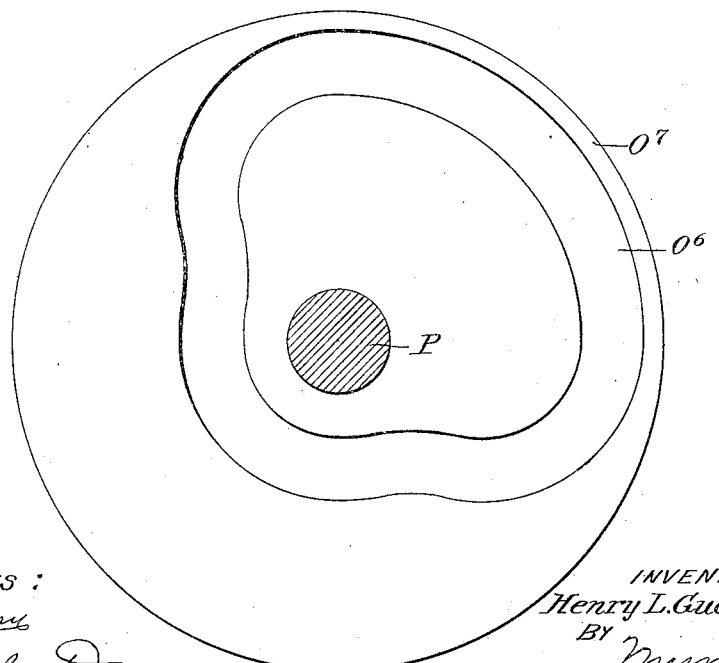

Figure 1 is a plan view of the improvement; Fig. 2 is a front elevation of the same, the can body conveyer being shown in section; Fig. 3 is a sectional plan view of the improvement on the line 3—3 of Fig. 2; Fig. 4 is a like view of the same showing the parts in a different position; Fig. 5 is an elevation of the right side of the machine; Fig. 6 is a like view of the left side of the machine; Fig. 7 is an enlarged transverse section of the improvement on the line 7—7 of Fig. 1; Fig. 8 is an enlarged sectional front elevation of details of the same on the line 8—8 of Fig. 1; Fig. 9 is a sectional plan view of part of the shifting mechanism for the ejecting rods, the section being on the line 9—9 of Fig. 8; Figs. 10 to 20 are enlarged face views of the various cams on the cam shafts; Fig. 21 is an enlarged sectional side elevation of a mandrel for holding a can body open at both ends; Fig. 22 is a similar view of a mandrel for holding a can body closed at one end; Fig. 23 is a side elevation of the can body and head before being assembled; and Fig. 24 is a sectional side elevation of the can body with the head crimped and compressed thereon.

The improved machine is mounted on a suitably constructed frame A on which is held to reciprocate both longitudinally and transversely a platen B having a series of semi-circular seats or saddles $B'$, $B^2$, $B^3$ arranged one alongside the other (see Figs. 3 and 4), and of which the seat $B'$ is adapted to engage a can body C for shifting the same to the right between a mandrel D and a spindle E employed for placing the can head $C'$ in position on the upper end of the can body C; the assembled can body and head being rotated by the said mandrel D and spindle E for a crimping roller F to crimp the flanges $C^2$ and $C^3$ of the can body and can head, the crimped can being then engaged by the seat $B^2$ of the platen B for moving the crimped can between another mandrel $D'$ and spindle $E'$, for rotating the crimped can, now pressed on its double seam $C^4$ by a compressing roller G, to render the seam $C^4$ air-tight without the use of solder, packings and the like, the finished can being engaged by the third seat $B^3$ of the platen B and shifted longitudinally onto the discharge table H, from which the finished cans pass down a chute or onto a traveling belt (not shown), for carrying the finished cans away from the machine.

The can bodies C are placed upright on the endless belt $I'$ of a conveyer I from which the can bodies C are pushed one after the other by a push head J (see Fig. 8) onto the table $I^2$ on which the can body is engaged by the first seat $B'$ of the platen B, as above described. The heads $C'$ are fed by an operator over a table $A'$ onto a revoluble feed disk K (see Fig. 7), from which the can heads $C'$ are successively pushed by a pusher L onto the supporting ring N located immediately below the spindle E (see Figs. 7 and 8) and above the mandrel D, so that when the latter is raised with a can body C thereon, the upper end of the can body is pushed through the opening in the supporting ring N, to engage the can head $C'$, so that the latter is pressed in place in the upper end of the can body, as indicated in Fig. 8. Thus at the mandrel D and the spindle E, the can bodies C and the heads $C'$ are assembled, and their flanges $C^2$ and $C^3$ are crimped by the crimping roller F, as previously stated.

In detail the construction of the machine is as follows: The platen B has its base or support $B^4$ (see Figs. 3, 4 and 7) mounted to slide in transverse guideways $O'$ of a carriage O reciprocating in longitudinal guideways $O^2$ arranged on the main frame A. On the base $B^4$ is formed a longitudinally extending guideway $B^5$ in which is mounted to slide a block $B^6$ pivotally connected with a slide $B^7$ mounted to slide transversely in bearings $B^8$ attached to the main frame A. The slide $B^7$ is pivotally connected with a link $B^9$ of a toggle lever having a link $B^{10}$ pivotally connected with the link $B^9$ and fulcrumed at $B^{11}$ on the main frame A. The links $B^9$, $B^{10}$ are pivotally connected at their connecting pivot with the link $B^{12}$ pivoted on a slide $B^{13}$ mounted to slide longitudinally in suitable bearings $B^{14}$ arranged on the main frame A. The left hand end of the slide $B^{13}$ is connected by a link $B^{15}$ with the lower end of a lever $B^{16}$ fulcrumed on the main frame A, and carrying at its upper end a friction roller $B^{17}$ (see Fig. 2), engaging a cam groove $B^{18}$ in a cam $B^{19}$ attached to a cam shaft P journaled in suitable bearings on the main frame A.

The shaft P is provided at its rear end (see Figs. 1 and 6) with a bevel gear wheel $P'$ in mesh with a bevel gear wheel $P^2$ secured on a longitudinally extending cam shaft $P^3$ journaled in suitable bearings on the main frame A. On the right hand end of the cam shaft $P^3$ is secured a gear wheel $P^4$ in mesh with a pinion $P^5$ (see Figs. 2 and 5) secured on a short shaft $P^6$ journaled on the main frame A. On the shaft $P^6$ is secured a pulley $P^7$ connected by a belt $P^8$ with a pulley $P^9$ attached to the main driving shaft $P^{10}$ extending longitudinally and journaled in suitable bearings on the main frame A. On the left hand end of the main driving shaft $P^{10}$ are secured the fast and loose pulleys $P^{11}$, $P^{12}$ connected by belt with other machinery, for imparting a rotary motion to the main driving shaft $P^{10}$, which by the pulleys $P^9$, $P^7$ and the belt $P^8$ imparts a rotary motion to the shaft $P^6$, which by the pinion $P^5$ and gear wheel $P^4$ rotates the cam shaft $P^3$, which in turn rotates the cam shaft P by the bevel gear wheels $P'$ and $P^2$. Thus when the machine is in operation and the cam shaft P is rotated, the cam $B^{19}$ imparts a swinging motion to the lever $B^{16}$ which by the link $B^{15}$, slide $B^{13}$, link $B^{12}$, toggle links $B^{10}$, $B^9$ slide $B^7$ and block $B^6$ imparts an intermittent reciprocating motion to the platen B in a transverse direction, to move the seats $B'$, $B^2$, $B^3$ into and out of engagement with the can bodies C as hereinafter more fully described.

The carriage O in which the platen B is mounted to reciprocate transversely is pivotally connected at its left side with a longitudinally extending link $O^3$ pivoted to the lower end of a lever $O^4$ fulcrumed on the main frame A, and carrying at its upper end a friction roller $O^5$ traveling in a cam groove $O^6$ in a cam $O^7$ attached to the cam shaft P, so that when the latter is rotated the said cam $O^7$ imparts a swinging motion to the lever $O^4$ which by the link $O^3$ reciprocates the carriage O in a longitudinal direction, and as the platen B is mounted in the said carriage it travels with the same, and hence the platen B reciprocates intermittently both in a transverse as well as in a longitudinal direction.

The mandrels D and $D'$ are alike in construction and operate in unison (see Figs. 7 and 8), and each is provided at its upper end with a head $D^2$ for the lower end of the can body C to rest on, and this head $D^2$ is secured on a shaft $D^3$ mounted to rotate and to slide vertically in suitable bearings $A^3$ arranged on the main frame A. On the shafts $D^3$ are adjustably secured sleeves $D^4$ carrying gear wheels $D^5$ both in mesh with a gear wheel $D^6$ secured on a vertically disposed shaft Q journaled in suitable bearings on the main frame A, and provided near its lower end with a bevel gear wheel $Q'$ (see Fig. 5) in mesh with a bevel gear wheel $Q^2$ secured on the main driving shaft $P^{10}$, so that when the machine is in operation, a rotary motion is given by the main shaft $P^{10}$ to the shaft Q, which by the gear wheel $D^6$ rotates the gear wheels $D^5$ and consequently the shafts $D^3$, so that the two mandrels D and $D'$ are simultaneously and uniformly rotated. The width of the gear wheel $D^6$ is somewhat in excess of that of the gear wheels $D^5$, so that the latter can move vertically with their shafts $D^3$ without moving out of mesh with the gear wheel $D^6$.

In order to impart a sliding motion in a vertical direction to the shafts $D^3$, the sleeves $D^4$ previously mentioned are engaged by a shifter bar $D^7$ in the sides of which are mounted to slide transversely the blocks $D^8$ pivotally connected with the arms $D^9$ secured to a hub $D^{10}$ mounted to turn on a shaft $D^{11}$ held in brackets $A^4$ (see Fig. 2) attached to the main frame A. From the hub $D^{10}$ depends an arm $D^{12}$ pivotally connected by a link $D^{13}$ with a bell crank lever $D^{14}$ (see Fig. 5) fulcrumed on the main frame A, and pivotally connected by an upwardly extending link $D^{15}$ with a lever $D^{16}$ carrying a friction roller $D^{17}$ engaging a cam groove $D^{18}$ in a cam $D^{19}$ attached to the cam shaft $P^3$, so that when the latter is rotated the cam $D^{19}$ imparts a swinging motion to the lever $D^{16}$, which by the link $D^{15}$, bell crank lever $D^{14}$, link $D^{13}$, arm $D^{12}$, hub $D^{10}$, arms $D^9$ and blocks $D^8$ imparts an up and down sliding motion to the shifter bar $D^7$, to raise and lower the mandrels D, $D'$ to move the can body C up and down toward and from the spindles E and $E'$. Now when the mandrel rises, its can body C is moved with its upper end through the opening in the supporting ring N to thus engage the can head C', whereby the can and can head are assembled as previously mentioned.

The spindles E and E' are alike in construction and operation, and hence it suffices to describe but one in detail. Each of the spindles is provided with a spindle head $E^2$ each held on the lower end of a vertically disposed shaft $E^3$ mounted to rotate in suitable bearings $A^5$ and $A^6$ formed on the main frame A. The heads $E^2$ of the spindles E and E' are each formed with an annular flange $E^4$, to engage the annular recess in the top of the corresponding can head C', and this flange $E^4$ has a straight outer face which forms an abutment or bearing when the flanges of the can body and can head are compressed by the crimping and compressing rollers F and G. On the shafts $E^3$ of the two spindles E and E' are secured gear wheels $E^5$ in mesh with a gear wheel $Q^4$ secured on the shaft Q previously mentioned, so that when the shaft Q is rotated the gear wheel $Q^4$ rotates both gear wheels $E^5$ and consequently the spindles E and E' in unison and in unison with the mandrels D and D' also driven from the said shaft Q, as previously explained.

The shafts $E^3$ are made hollow to receive pusher rods R, each of which is provided at its lower end with a head R' adapted to engage the top of the can head C' at the center thereof, to push the united can body and can head with the crimped or compressed flanges down in unison with the downwardly moving mandrels D and D'. The rod R is free to move upward to bring the head R' into a recess in the lower end of the shaft $E^3$, so as to move the under face of the head R' out of alinement with the under face of the head $E^2$, so that the head R' is free of the can head C' during the time the can head and body are rotated by the rotating mandrels D, D' and the spindles E, E'.

Near the upper end of each rod R (see Figs. 8 and 9) is secured a bar $R^2$ held in a ring $R^3$ loosely surrounding the shaft $E^3$, the said bar $R^2$ extending through vertically disposed slots $E^6$ formed in the shaft $E^3$. The collars $R^3$ on the two shafts $E^3$ are engaged by a shifter bar $R^5$ provided with transversely sliding blocks $R^6$ pivotally connected with arms $R^7$ held on a bar $R^8$ mounted to turn on a shaft $R^9$ journaled in brackets $A^7$ attached to the main frame A, and from the said bar $R^8$ projects rearwardly an arm $R^{10}$ carrying a friction roller $R^{11}$ traveling in a cam groove $R^{12}$ formed on a cam $R^{13}$ secured to the cam shaft $P^3$. Now when the machine is running the rotary motion given to the cam shaft $P^3$ causes the cam $R^{13}$ to impart a swinging motion to the arm $R^{10}$, which by the arms $R^7$ and sliding blocks $R^6$ imparts an up and down sliding motion to the shifter bar $R^5$, to move the rods R in a like direction in unison with the movement given to the mandrels D and D', as previously explained, so that the can heads are disengaged from the spindles E and E'. The heads $E^2$ of the spindles E and E' extend within chambers N' and $N^2$ formed in a casing $N^3$ secured by set screws $N^4$ or other means to the lower bearings $A^5$ for the shafts $E^3$, the said casing $N^3$ carrying the supporting ring N previously mentioned, and serving to support the can head C' in place until the can head is engaged by the can C rising with the mandrel D.

The rear portions of the chambers N' and $N^2$ are open for the entrance of the crimping roller F and the compressing roller G as indicated in Fig. 7, so that the roller F can act on the flanges $C^2$, $C^3$ to form the double seam $C^4$, and the roller G can press the double seam $C^4$, as before mentioned. The front of the chamber N' is also open for the entrance of a can head C' pushed from the disk K by the push head L.

The crimping roller F and the compressing roller G are mounted to turn loosely on levers F', G', respectively, fulcrumed on vertically disposed pivot pins S, S' adjustably held, as hereinafter more fully described. The levers F', G' are pivotally connected with transversely extending links $F^2$, $G^2$ provided at their outer ends with cross heads $F^3$, $G^3$ engaging the outer ends of springs $F^4$, $G^4$ resting at their inner ends on cross heads $F^5$, $G^5$ attached on the inner ends of links $F^6$, $G^6$ pivotally connected with the lower ends of upwardly extending levers $F^7$, $G^7$ fulcrumed on a rod $A^8$ attached to the main frame A. The upper ends of the levers $F^7$, $G^7$ carry friction rollers $F^8$, $G^8$ traveling in cam grooves $F^9$, $G^9$ formed on cams $F^{10}$, $G^{10}$ secured on the cam shaft $P^3$, so that when the machine is in operation and a rotary motion is given to the cam shaft $P^3$, then the cams $F^{10}$, $G^{10}$ impart a swinging motion to the levers $F^7$, $G^7$, which by the yielding connection described rocks the levers F', G', to move the crimping roller F and the compressing roller G in engagement with the flanges and seam, as above described. By having a yielding connection between the levers F', G' and $F^7$, $G^7$, the crimping roller F and the compressing roller G readily yield to any irregularities during the crimping and compressing operation. The tensions of the springs $F^4$, $G^4$ can be regulated by adjusting the cross heads $F^3$, $F^5$ and $G^3$, $G^5$ on the corresponding links $F^2$, $F^6$ and $G^2$, $G^6$.

Each of the pins S, S' is secured on a bearing $S^2$ mounted to slide transversely on a guideway $S^3$, and in the said bearing screws a screw rod $S^4$ mounted to turn in a bearing $S^5$ arranged on the main frame A (see Figs. 3, 4 and 7). On the outer end of the screw rod $S^4$ is secured a hand wheel $S^6$ adapted to be turned by the operator, to shift the bearing $S^2$ transversely, with a view to move the corresponding pivot pin S or S' into the proper position for the corresponding crimping roller F and the compressing roller G to act to the best advantage on the flanges and double seam of the cans. When the desired adjustment of the pins S, S' has been made the bearings $S^2$ are fastened in place, and for this purpose each bearing $S^2$ is provided with an elongated slot $S^7$ through which extends a tap bolt $S^8$ screwing in the guideway $S^3$. Thus on screwing up the tap bolt $S^8$ the bearing $S^2$ and consequently the pins S, S' are permanently fastened in place.

The can body delivering mechanism I is arranged as follows: The endless conveyer belt I' previously mentioned passes with its upper run through a conveyer frame $I^3$ and at its rear end over pulleys $I^4$, $I^5$ and at its front end over pulleys (not shown), and the said pulleys $I^4$, $I^5$ (see Figs. 5 and 6) are journaled in a slide $I^6$ and on the shaft of the upper pulley $I^4$ is hung the rear end of the frame $I^3$ hung at its forward end on a slide $I^7$, and the said slides $I^6$ and $I^7$ are mounted to slide vertically in bearings $I^8$, $I^9$ arranged on the main frame A. The slides $I^6$, $I^7$ are engaged by screw rods $I^{10}$ mounted to turn in the main frame A and under the control of the operator for raising and lowering the slides $I^6$, $I^7$ and consequently the conveyer frame $I^3$ and the endless conveyer belt I', with a view to adjust the parts relative to the length of the can bodies C to be treated in the machine at the time. Thus for longer can bodies the slides $I^6$, $I^7$ are lowered and for shorter can bodies the slides are raised so as to bring the upper run of the conveyer belt I' in proper relation to the platen B, for the latter to engage the can bodies approximately midway of their height, as indicated in Fig. 8. After the desired adjustment of the slides $I^6$, $I^7$ is made, they are secured permanently in place by the use of tap bolts $I^{11}$ (see Fig. 2) extending through elongated slots $I^{12}$ in the said slides and screwing in the main frame A.

To the left of the upper run of the conveyer belt I' are arranged a number of arms T, T', $T^2$ secured on the upper ends of vertically disposed shafts $T^3$ journaled in suitable bearings arranged on the left hand side of the conveyer frame $I^3$. The lower ends of the shafts $T^3$ are provided with angular arms $T^4$ pivotally connected with each other by a link $T^5$, so that when a swinging motion is given to one of the shafts $T^3$ the several arms T, T', $T^2$ swing in unison across the upper run of the conveyer belt I', a short distance above the same, to intercept the can bodies C traveling on the conveyer belt I'. Thus the forward traveling motion of the can bodies is interrupted and held in position one behind the other suitable distances apart until the arms T, T', $T^2$ receive a swinging motion in an outward direction, to allow the can bodies to again travel forward with the conveyer belt I' until the said arms T, T', $T^2$ swing back to the innermost position to again interrupt the forward movement of the can bodies. The movement of the arms T, T', $T^2$ takes place simultaneously and at such time that one can body only can travel inward from one arm to another before its inward movement is interrupted, and this movement of the arms T, T', $T^2$ takes place during each travel from the right to the left hand position of the carriage O. In order to impart the desired motion to the arms T, T', $T^2$, the shaft $T^3$ of the first arm T is provided with an angular arm $T^6$ connected by a link $T^7$ with an arm $T^8$ secured on a vertically disposed shaft $T^9$ (see Fig. 6) journaled in suitable bearings on the main frame A. On the shaft $T^9$ is secured an arm $T^{10}$ connected by a link $T^{11}$ with the lower end of an upwardly extending lever $T^{12}$ fulcrumed on the main frame A, and carrying at its upper end a friction roller $T^{13}$ engaging a cam groove $T^{14}$ formed on a cam $T^{15}$ secured on the cam shaft P. Now when the machine is in operation and the cam shaft P is rotated then the cam $T^{15}$ imparts a swinging motion to the lever $T^{12}$, which by the link $T^{11}$ and arm $T^{10}$ rocks the shaft $T^9$, and the latter by the arm $T^8$, link $T^7$ and arm $T^6$ rocks the first shaft $T^3$ and hence also the other shafts $T^3$, so that the arms T, T', $T^2$ receive the intermittent swinging motion above mentioned.

The can body C when released by the last arm $T^2$ is carried by the conveyer belt I' in front of the push head J which pushes the can body off the belt I' onto the table $I^2$ held on the conveyer frame $I^3$ (see Fig. 8). The push head J is secured to a longitudinally extending slide J' mounted to slide in suitable bearings $J^2$ attached to the main frame A, and near the outer end of the slide J' is secured or formed a vertically disposed guideway $J^3$ in which is mounted to slide a block $J^4$ pivotally connected with the lower end of a lever $J^5$ fulcrumed at $J^6$ on the main frame A, as plainly illustrated in Fig. 6. The upper end of the lever $J^5$ carries a friction roller $J^7$ traveling in a cam groove $J^8$ on a cam $J^9$ secured on the cam shaft P, so that when the machine is in operation and the cam shaft P is rotated the cam $J^9$ imparts a swinging motion to the lever $J^5$, which by its connection with the slide J' forces the latter to reciprocate intermittently in a longitudinal direction, to move the push head J in a like direction for pushing a can body off the belt I' onto the table $I^2$. A guard $J^{10}$ is secured to the front side of the push head J (see Figs. 3 and 4), to prevent a can body C from traveling accidentally behind the push head J at the time the latter is on the return stroke from the table $I^2$ to the left side of the conveyer belt I'.

In order to prevent the can body C from jumping while being pushed by the push head J from the belt I' onto the table $I^2$, a guard U is provided located above the table I² and curved upwardly at its forward end, as plainly illustrated in Fig. 8. The guard U is attached to the under side of an arm U' fulcrumed at U² on the main frame A, so as to be free to swing up and down, and the free end of the arm U' is provided with a notch U³ into which extends a projection N⁶ of the casing N³, so as to limit the up and down swinging motion of the arm U'. Now by the arrangement described, the can body C on being pushed by the push head J from the conveyer belt I' onto the table I² passes underneath the guard U which rides loosely on the top of the can body C, to prevent the latter from being pushed or jumped upward.

The discharge table H for the finished cans is provided with a downwardly extending bracket H' (see Figs. 3, 4, 5 and 8) mounted to slide in suitable guideways A¹⁰ arranged on the main frame A, and the said bracket H' is engaged by a screw rod H² screwing in a nut A¹¹ on the main frame A, to move the table H up or down, so as to bring the upper surface of the table in proper relation to the platen B and according to the length of the can to be transferred by the platen onto the table H. After the desired adjustment of the table H is made it is fastened permanently in place by tap bolts H³ screwing in the main frame A and passing through elongated slots in the bracket H'. A guard rail H⁴ is secured to the table H at the front thereof and this guard rail has a portion cut out at the left hand end for the passage of the platen B which on receding leaves the can on the table H, as the guard rail H⁴ holds the can against moving with the platen B during the latter's receding movement, see Fig. 8. A guard rail H⁵ is arranged on the rear of the table H and extends longitudinally above the mandrels D', D and to the rear of the table I² and over the upper run of the conveyer belt I', as plainly illustrated in Figs. 3 and 4. This guard rail H⁵ is attached at its ends to transversely extending screws H⁶, H⁷, of which the screw H⁶ is adjustably held in a bracket H⁸ held vertically adjustable on a rod H⁹ and adapted to be fastened thereto by a set screw H¹⁰. The rod H⁹ is held vertically adjustable on the table H and is adapted to be fastened thereto by a set screw H¹¹ (see Fig. 5). The other screw rod H⁷ is held adjustable in a bracket H¹² adapted to be fastened in place on the rod H¹³ by a set screw H¹⁴. Thus by the arrangement described the guard rail H⁵ can be adjusted both in a lateral direction as well as up and down, according to the size of the can under treatment at the time. By extending the guard rail H⁵ across the conveyer belt I' immediately in the rear of the push head J, the can body released by the last arm T² is carried by the conveyer belt I' until it abuts against the guard rail H⁵, so that this can body is in proper position for the push head J to take hold of and push it from the conveyer belt I' onto the table I² and under the guard U, as previously explained. A guard rail H¹⁵ secured to the conveyer frame I³ (see Figs. 3 and 4) extends on the front side of the table I² to prevent displacement of a can body when pushed from the conveyer belt I' by the push head J onto the table I².

The disk K of the can head feeding mechanism (see Figs. 1, 2, 5, 7 and 8) is secured on a vertically disposed shaft K' journaled in suitable bearings on the main frame A, and on the said shaft is formed or secured a bevel gear wheel K² in mesh with a bevel pinion K³ secured on a longitudinally extending shaft K⁴ journaled in suitable bearings on the main frame A, and on the said shaft K⁴ is fastened a pulley K⁵ connected by a crossed belt K⁶ with a pulley K⁷ secured on the cam shaft P³, so that when the machine is in operation the said cam shaft P³ transmits a rotary motion by the said pulleys K⁷, K⁵ and belt K⁶ to the shaft K⁴, which by the gear wheels K³, K² continually rotates the feed disk K in the direction of the arrow a'. The can heads C' are fed one after another by an operator standing in front of the machine over the table A' onto the right hand side of the disk K which carries the can head C' under a shield or hood K⁸ attached to or forming part of the main frame A and extending over the left hand and rear portions of the disk K. The hood K⁸ is provided at its entrance end with a vertically adjustable gage plate K⁹ (see Fig. 5) to prevent more than one can head C' from passing under the hood K⁸ at a time.

The can heads C' while traveling with the disk K are interrupted by a pin V extending into the path of the can head C', and the said pin is periodically and automatically moved out of engagement with the intercepted can head C' by the action of a can body C pushed at the time from the conveyer belt I' by the push head J onto the table I². For this purpose the pin V depends from an arm V' fulcrumed at V² on the top of the hood K² and pressed on by a spring V³, to hold the arm V' and pin V normally in an active position; that is, to hold the pin V in front of the can head C'. The arm V' is pivotally connected by a link V⁴ with a bell crank lever V⁵ fulcrumed at V⁶ on the main frame A and carrying at its rearward arm a depending pin V⁷ adapted to pass into the path of a can body C when the latter is pushed off the belt I' by the push head J. When this takes place the can body acts on the pin V⁷, thus imparting a swinging motion to the bell crank lever V⁵ which by the link V⁴ imparts a swinging motion to the arm V' to move the pin V out of engagement with the can head C', so that the latter is now free to travel onward on the disk K and thereby pass in front of the push head L now in an outermost position, as indicated in Fig. 7. As soon as the can body has passed the pin $V^7$, the bell crank lever $V^5$ and the arm $V'$ are immediately returned to their former position by the action of the spring $V^3$, so that the pin V passes in front of the next following can head $C'$ on the disk K, thus holding the can heads on the rotating disk K, stationary for the time being. The push head L (see Fig. 7) is secured on a slide $L'$ mounted to slide transversely in suitable bearings $L^2$ secured on the main frame A. On the slide $L'$ is formed a vertically disposed guideway $L^3$ engaged by a block $L^4$ pivotally connected to the lower end of an upwardly extending lever $L^5$ fulcrumed at $L^6$ on the main frame A (see Fig. 5), and the upper end of this lever $L^5$ is pivotally connected by a link $L^7$ with a bell crank lever $L^8$ fulcrumed at $L^9$ on the main frame A, and carrying a friction roller $L^{10}$ engaging a cam groove $L^{11}$ in one face of a double cam $L^{12}$ secured on the cam shaft $P^3$. Thus when the machine is in operation, and the cam shaft $P^3$ is operated then the cam $L^{12}$ imparts a rocking motion to the bell crank lever $L^8$ which by the link $L^7$ rocks the lever $L^5$, which by its connection with the slide $L'$ reciprocates the latter in the bearings $L^2$, so that the push head L moving with the slide $L'$ pushes a can head $C'$ from the disk K over onto the supporting ring N in the chamber $N'$ of the casing $N^3$. The right hand side of the push head L is provided with a transversely extending guard arm $L^{13}$ adapted to engage the forward edge of the next following can head $C'$ to prevent the same from traveling accidentally into the path of the push head L during the return or outward stroke of the latter.

A guard W in the form of a transversely extending bar is arranged adjacent to the push head L and serves to hold the can head down to prevent the same from being accidentally jammed against the spindle head $E^2$ of the spindle E at the time the can head is pushed into the chamber $N'$ and onto the ring N by the push head L. This guard W projects from the free end of a longitudinally extending arm $W'$ fulcrumed on the main frame A, and pivotally connected by a link $W^2$ with a lever $W^3$ fulcrumed at $L^9$ on the main frame A. The lever $W^3$ carries a friction roller $W^4$ engaging a cam groove $W^5$ in the double cam $L^{12}$, so that when the machine is in operation and the cam $L^{12}$ rotates, a swinging motion is given to the lever $W^3$, which by the link $W^2$ imparts an up and down swinging motion to the arm $W'$, which consequently raises and lowers the guard W, to move the same in proper relation relative to the can head $C'$ for the purpose above described.

During the time the carriage O is at a standstill, it is desirable to lock the same in place, and for this purpose the following device is provided: On the rear side of the carriage O are formed spaced notches $O^8$, $O^9$ (see Figs. 3, 4 and 7), one of which is adapted to be engaged at the time by a locking bolt X mounted to slide transversely, arranged on the main frame A. The locking bolt X is provided near its rear end with a vertically extending guideway $X'$ in which is mounted to slide a block $X^2$ pivotally connected with the lower end of a lever $X^3$ fulcrumed at $X^4$ on the main frame A and carrying with it at its upper end a friction roller $X^5$ traveling in a cam groove $X^6$ formed on a cam $X^7$ secured on the cam shaft $P^3$. Thus when the machine is in operation and the cam shaft $P^3$ is rotated, the cam $X^7$ imparts an intermittent swinging motion to the lever $X^3$, to move the locking bolt X transversely in and out of engagement with the notches $O^8$, $O^9$, respectively. Thus when the several parts are in the position shown in Fig. 3, the carriage O is locked by the bolt X in its right hand side position, and when the several parts are in the position shown in Fig. 4, then the bolt X locks the carriage O in the left hand side position.

It is understood that the bolt X moves out of engagement with the notch $O^8$ or $O^9$ immediately previous to the carriage moving from the left to the right or from the right to the left, and as soon as the carriage O has been shifted the bolt X engages the corresponding notch $O^8$ or $O^9$ to lock the carriage O against movement.

The operation is as follows: When the machine is running the can bodies C are successively pushed off the conveyer belt $I'$ onto the table $I^2$, and at this point the can body is engaged by the first seat $B'$ of the platen B now moving rearwardly, and also engaging with its seat $B^2$ the can body of a can already crimped by the action of the mandrel D, spindle E and crimping roller F, the platen B by its seat $B^3$ also engaging the can body of a can completely crimped and pressed by the action of the mandrel $D'$, the spindle $E'$ and compressing roller G. As soon as the platen B has engaged the can bodies as above described the mandrels D, $D'$ and the push rods R move downward so as to move the crimped can downward and its upper end out of the chamber $N'$ and the supporting ring N and until the seam $C^4$ rests on top of the seat $B^2$. In a like manner the finished can is moved downward for its upper end to pass out of the chamber $N^2$ and its seam $C^4$ to seat itself on the seat $B^3$. The push rods R now return to their uppermost positions. The carriage O is now shifted from the left to the right so that the platen B moves in a like direction to the position shown in Fig. 3, and its seat $B^3$ moves the finished can over onto the table H, the seat $B^2$ moves the crimped can from the crimping device to the compressing device, and the seat B' moves the can body from the table I² to the crimping device that is centrally over the mandrel D. At about the same time a can head C' is pushed from the disk K by the push head L into the chamber N' and over the ring N. The mandrels D, D' now rise to engage and lift the can body and the crimped can so that the upper end of the can body on the mandrel D is pushed up through the ring N into the chamber N' and into engagement with the can head C' abutting against the under side of the head E² of the spindle E. The upper end of the crimped can on the mandrel D' passes into the chamber N² and engages the head of the spindle E' at the time the can body C and the can head C' are assembled in the chamber N', as above described, and as the mandrels D, D' and the spindles E, E' rotate in unison and firmly clamp both cans between them, it is evident that the cans are revolved. At this time the levers F' and G' swing the rollers F and G into engagement with the flanges C², C³ and the seam C⁴ respectively, for the roller F to crimp the flanges C², C³ and the roller G to compress the seam C⁴. During this operation the push head J and the platen B are returning, that is, the platen B is moved forwardly to disengage the can bodies clamped between the mandrels D, D' and spindles E, E', and to leave the finished can on the table H. When a finished can is carried by the platen B from the compressing device to the table H, as above described, it pushes the previously deposited cans on the table H outward thereon to discharge the cans successively from the outer end of the table H. The carriage O is now shifted from the right to the left to bring the platen B back to the starting position shown in Fig. 4.

It is understood that during the crimping operation the flanges C², C³ of the assembled can body C and can head C', are doubled up to form a double seam, which readily clears the opening in the supporting ring N on the downward movement of the crimped can, as above described. It is also understood that the can head C' when passing into the chamber N' is supported by its flange C³ on top of the ring N, the flange C³ being somewhat larger in diameter than the diameter of the ring N. The mandrels D, D' and spindles E, E' are revolved at a high rate of speed, and the rollers F and G are held with uniform pressures against the flanges and double seam, to insure the formation of a non-leaking seam. The seats B', B² and B³ correspond in size to that of the can bodies, and the flange C² and the seam C⁴ prevent a can body from moving down and out of a seat, as the flange C² and seam C⁴ on engaging the top of a seat prevent further downward movement of the can body.

The top faces of the mandrel heads D² may be plain, as shown in Figs. 7 and 8, or provided with circular offsets D²⁰ or D²¹, as shown in Figs. 21 and 22. The offset D²⁰ is for use on can bodies open at both ends and is adapted to pass into the lower open end of a can body C, to hold the same in a central position on the mandrel D or D'. The offset D²¹ is used on cans already closed by a head C' on the lower end, and this offset D²¹ is recessed at the upper face to fit the head C' of the can, for holding the latter in central position on the mandrel D or D' and preventing accidental slipping or shifting of the same.

The various mechanisms are driven from the main shaft and operate in the sequence mentioned to produce the desired result.

It is understood that the machine can be used for first placing one head on the cylindrical can-body and crimping the flanges thereof, as described, and then when the can is filled it is again sent through the machine to place the other head or cover upon the body and to crimp and compress the flanges thereof, to form a double seam, so that the filled can finally leaves the machine in a completely hermetically sealed condition, no solder, packing, or other material or device being employed for rendering the can proof against leakage and at the same time air-tight.

Having thus described my invention, I claim as new and desire to secure by Letters Patent:—

1. A can capping machine having a mandrel, a spindle, a supporting device at the spindle for receiving and supporting the can head, a platen for bringing a can body between the said mandrel and spindle, means for raising the said mandrel to push the can body in engagement with the said can head and means for rotating the spindle and the mandrel in unison to assemble the said body and head.

2. A can capping machine having a mandrel, a spindle, a supporting device at the spindle for receiving and supporting the can head, a platen for bringing a can body between the said mandrel and spindle, means for raising the said mandrel to push the can body in engagement with the said can head to assemble the said body and head, means for rotating the said mandrel and spindle, means for crimping the flanges of the said can and can head and means for rotating the spindle and the mandrel in unison.

3. A can capping machine having a mandrel, a spindle, a supporting device at the spindle for receiving and supporting the can head, a platen for bringing a can body between the said mandrel and spindle, means for raising the said mandrel to push the can body in engagement with the said can head to assemble the said body and head, a feeding device for feeding a can body in position on the said supporting device and means for rotating the spindle and the mandrel in unison.

4. A can capping and compressing machine having a reciprocating carriage, a platen mounted to slide on the said carriage at an angle to the movement of the carriage, said platen having seats for engaging a plurality of spaced cans, an assembling and crimping device, a compressing device, the said platen successively moving the can from the said assembling and crimping device to the said compressing device, a feeding device for delivering the can bodies successively to the said platen, and a feeding device for delivering the can heads to the said assembling and crimping device.

5. A can capping and compressing machine having an assembling device for assembling a can body and a can head, comprising a reciprocating mandrel for carrying the can body, a spindle in axial alinement with the said mandrel, and a supporting ring concentric with the said spindle and adapted to support a can head between the said ring and the spindle, the said mandrel pushing the can body into the ring and in engagement with the can head abutting against the spindle.

6. A can capping and compressing machine having an assembling device for assembling a can body and a can head, comprising a reciprocating mandrel for carrying the can body, a spindle in axial alinement with the said mandrel, a supporting ring concentric with the said spindle and adapted to support a can head between the said ring and the spindle, the said mandrel pushing the can body into the ring and in engagement with the can head abutting against the spindle, means for rotating the said mandrel and spindle in unison, and a crimping roller for crimping the flanges of the assembled can body and can head while being rotated by the said mandrel and spindle.

7. A can capping and compressing machine having an assembling device for assembling a can body and a can head, comprising a reciprocating mandrel for carrying the can body, a spindle in axial alinement with the said mandrel, a supporting ring concentric with the said spindle and adapted to support a can head between the said ring and the spindle, the said mandrel pushing the can body into the ring and in engagement with the can head abutting against the spindle, means for rotating the said mandrel and spindle in unison, a crimping roller for crimping the flanges of the assembled can body and can head while being rotated by the said mandrel and spindle, and an ejecting rod movable axially in the said spindle for pushing the assembled and crimped can body and can head free of the spindle and out of the said supporting ring.

8. A can capping and compressing machine having an assembling device for assembling a can body and a can head, comprising a reciprocating mandrel for carrying the can body, a spindle in axial alinement with the said mandrel, a supporting ring concentric with the said spindle and adapted to support a can head between the said ring and the spindle, the said mandrel pushing the can body into the ring and in engagement with the can head abutting against the spindle, and a chamber for containing the said spindle and the can head and carrying at its open end the said ring.

9. A can capping and compressing machine comprising an endless conveyer belt for carrying the can bodies, a pushing device for successively pushing the can bodies off the said belt at an angle to the direction of the travel of the belt, a table for receiving the can body pushed off the said belt, an assembling and crimping device, and a platen having intermittently reciprocating motions in both a transverse and a longitudinal direction, the platen having means for engaging the can body on the said table and moving it to the said assembling and crimping device.

10. A can capping and compressing machine comprising an endless conveyer belt for carrying the can bodies, a pushing device for successively pushing the can bodies off the said belt at an angle to the direction of the travel of the belt, a table for receiving the can body pushed off the said belt, an assembling and crimping device, a platen having intermittently reciprocating motions in both a transverse and a longitudinal direction, the platen having means for engaging the can body on the said table and moving it to the said assembling and crimping device, and a can head pushing device for pushing a can head to the said assembling and crimping device.

11. A can capping and compressing machine having a can head feeding device comprising a revoluble disk for carrying the can heads one behind the other, a retaining device adapted to pass temporarily into the path of a can head to hold the latter against movement for a time and then to release it, and an intermittently reciprocating pusher head for pushing the released can head off the said disk.

12. A can capping and compressing machine having a can head feeding device comprising a revoluble disk for carrying the can heads one behind the other, a retaining device adapted to pass temporarily into the path of a can head to hold the latter against movement for a time and then to release it, an intermittently reciprocating pusher head for pushing the released can head off the said disk, and a guide bar extending over the can head while being pushed off the disk by the said pusher head.

13. A can capping and compressing machine having a can head feeding device comprising a revoluble disk for carrying the can heads one behind the other, a retaining device adapted to pass temporarily into the path of a can head to hold the latter against movement for a time and then to release it, an intermittently reciprocating pusher head for pushing the released can head off the said disk, a guide bar extending over the can head while being pushed off the disk by the said pusher head, and means for intermittently raising and lowering the said guide bar.

14. A can capping and compressing machine having a can head feeding device comprising a revoluble disk for carrying the can heads one behind the other, a retaining device adapted to pass temporarily into the path of a can head to hold the latter against movement for a time and then to release it, an intermittently reciprocating pusher head for pushing the released can head off the said disk, a guide bar extending over the can head while being pushed off the disk by the said pusher head, actuating means for intermittently reciprocating the said pusher head, and actuating means for the said guide bar and operating in unison with the said actuating means for the pusher head.

15. A can capping and compressing machine having a can head feeding mechanism provided with a revoluble disk for carrying the can heads one behind the other, and an intermittently reciprocating push head for pushing a can head off the said revoluble disk, the said push head having a guard arm on the side adjacent to the approaching can head to hold the latter against movement during the return stroke of the push head.

16. A can capping and compressing machine having a can body feeding device provided with an endless conveyer belt for carrying the can bodies one behind the other, and an intermittently reciprocating push head moving at an angle to the direction of travel of the said conveyer belt, the said push head having a guard arm on the side adjacent to an approaching can body to hold the latter against movement during the return stroke of the push head.

17. A can capping and compressing machine provided with a can body feeding device having a conveyer comprising an endless conveyer belt, pulleys over which the said belt passes, a conveyer frame for the upper run of the said conveyer belt, slides carrying the said conveyer frame and the said pulleys, means for raising and lowering the said slides to adjust the conveyer for different sized can bodies and independent means for fixing the slides in their adjusted position.

18. A can capping and compressing machine provided with a can body feeding device having a conveyer comprising an endless conveyer belt, pulleys over which the said belt passes, a conveyer frame for the upper run of the said conveyer belt, slides carrying the said conveyer frame and the said pulleys, means for raising and lowering the said slides to adjust the conveyer for different sized can bodies, a table on one side of the said conveyer frame, an intermittently reciprocating push head reciprocating across the upper run of the said belt to push a can body off the belt onto the said table and independent means for fixing the slides in their adjusted position.

19. A can capping and compressing machine provided with a can body feeding device having a conveyer comprising an endless conveyer belt, pulleys over which the said belt passes, a conveyer frame for the upper run of the said conveyer belt, slides carrying the said conveyer frame and the said pulleys, means for raising and lowering the said slides to adjust the conveyer for different sized can bodies, a table on one side of the said conveyer frame, an intermittently reciprocating push head reciprocating across the upper run of the said belt to push a can body off the belt, a guard rail extending across the said belt at the rear of the said push head and at the rear side of the said table and independent means for fixing the slides in their adjusted position.

20. A can capping and compressing machine provided with a can body feeding device having a conveyer comprising an endless conveyer belt, pulleys over which the said belt passes, a conveyer frame for the upper run of the said conveyer belt, slides carrying the said conveyer frame and the said pulleys, means for raising and lowering the said slides to adjust the conveyer for different sized can bodies, a table on one side of the said conveyer frame, an intermittently reciprocating push head reciprocating across the upper run of the said belt to push a can body off the belt, a guard rail extending across the said belt at the rear of the said push head and at the rear side of the said table, and means for adjusting the said guard rail up and down and toward and from the said push head and table and independent means for fixing the slides in their adjusted position.

21. A can capping and compressing machine provided with a revoluble can head feeding disk, a fixed hood extending over a portion of the said disk to guide the can heads carried along by the said disk, and a fixed feed table on a level with the said disk for feeding the can heads onto the disk, and a gage plate held on the entrance end of the said hood to prevent more than one can head from passing under the hood at a time.

22. A can capping and compressing machine provided with a reciprocating platen for carrying the finished cans, a discharge table onto which the finished cans are delivered by the said platen, the said table having a guard rail at its front side for retaining a can in position on the table on the withdrawing stroke of the platen, and means for raising and lowering the said table.

23. A can carrying and compressing machine provided with a reciprocating platen for carrying the finished cans, a discharge table onto which the finished cans are delivered by the said platen, the said table having a guard rail at its front side for retaining a can in position on the table on the withdrawing stroke of the platen, means for raising and lowering the said table, a rear guard rail for the said table, and means for adjusting the said rear guard rail independent of the said table.

24. A can carrying and compressing machine provided with a reciprocating platen for carrying the finished cans, a discharge table onto which the finished cans are delivered by the said platen, the said table having a guard rail at its front side for retaining a can in position on the table on the withdrawing stroke of the platen, means for raising and lowering the said table, a rear guard rail for the said table, and means for adjusting the said rear guard rail independent of the said table and in both an up and down and a transverse direction.

25. A can capping and compressing machine having a roller for crimping or compressing purposes, a lever on which the roller is journaled, an actuating mechanism, and a flexible connection between the said actuating mechanism and the said lever, the said flexible connection comprising links of which one is connected with the lever and the other with the actuating mechanism, cross-heads on the links, a rod upon which the cross-heads slide and a spring encircling the rod and interposed between the said cross heads.

26. A can capping and compressing machine having a carrier for the can bodies, a table, a push head for pushing a can body off the carrier onto the said table, and a guard riding on top of the can body during its transfer from the said carrier onto the said table.

27. A can capping and compressing machine having a carrier for the can bodies, a table, a push head for pushing a can body off the carrier onto the said table, a guard riding on top of the can body during its transfer from the said carrier onto the said table, and a swing arm carrying the said guard.

28. A can capping and compressing machine having a carrier for the can bodies, a table, a push head for pushing a can body off the carrier onto the said table, a guard riding on top of the can body during its transfer from the said carrier onto the said table, a swing arm carrying the said guard, and means for limiting the swinging motion of the said swing arm.

29. A can capping and compressing machine provided with an intermittently reciprocating carriage, a platen mounted to reciprocate intermittently on the carriage at an angle to the movement of the carriage, and a locking device for locking the said carriage in position at the end of its movement in either direction.

30. A can capping and compressing machine provided with an intermittently reciprocating carriage, a platen mounted to reciprocate intermittently on the carriage at an angle to the movement of the carriage, and a locking device for locking the said carriage in position at the end of its movement in either direction and unlocking the carriage immediately previous to its movement in either direction.

In testimony whereof I have signed my name to this specification in the presence of two subscribing witnesses.

HENRY LOUIS GUENTHER.

Witnesses:
HENRY H. UNRUH,
MARY E. DU BOIS.